United States Patent
Sturt

(10) Patent No.: US 6,604,772 B2
(45) Date of Patent: Aug. 12, 2003

(54) EXTENDER BLADE MOUNTING FRAME FOR A SUN VISOR

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/038,070

(22) Filed: Nov. 9, 2001

(65) Prior Publication Data

US 2003/0090123 A1 May 15, 2003

(51) Int. Cl.⁷ .................................................. B60J 3/00
(52) U.S. Cl. ..................................... 296/97.8; 296/97.5
(58) Field of Search ............................ 296/97.1, 97.5, 296/97.8; 362/492

(56) References Cited

U.S. PATENT DOCUMENTS

| | | |
|---|---|---|
| 3,926,470 A | 12/1975 | Marcus |
| 4,000,404 A | 12/1976 | Marcus |
| 4,227,241 A | 10/1980 | Marcus |
| 4,486,819 A | 12/1984 | Marcus et al. |
| 4,653,798 A | 3/1987 | White et al. |
| 4,764,852 A | 8/1988 | Sakuma |
| 4,858,983 A | 8/1989 | White et al. |
| 4,922,391 A | 5/1990 | Dykstra |
| 4,952,008 A | 8/1990 | Lobanoff et al. |
| 5,005,895 A | 4/1991 | Muyres et al. |
| 5,042,867 A | 8/1991 | Crotty, III et al. |
| 5,278,736 A | 1/1994 | Falcoff et al. |
| 5,316,361 A | 5/1994 | Miller |
| 5,331,518 A | 7/1994 | Roark et al. |
| 5,338,082 A | 8/1994 | Miller |
| 5,365,416 A | 11/1994 | Peterson |
| 5,374,097 A | 12/1994 | George et al. |
| 5,580,118 A | 12/1996 | Crotty, III |
| 5,749,618 A | 5/1998 | Jones |
| 5,810,420 A * | 9/1998 | Welling ..................... 296/97.5 |
| 5,833,299 A | 11/1998 | Corn |
| 5,887,933 A | 3/1999 | Peterson |
| 5,906,424 A | 5/1999 | Peterson |
| 5,964,494 A | 10/1999 | Miller |
| 6,033,005 A | 3/2000 | Crotty, III |
| 6,099,066 A | 8/2000 | Corn |
| 6,189,949 B1 | 2/2001 | Miller et al. |
| 6,199,934 B1 * | 3/2001 | Sturt ......................... 296/97.1 |
| 6,254,168 B1 | 7/2001 | Crotty, III |

* cited by examiner

*Primary Examiner*—Dennis H. Pedder
(74) *Attorney, Agent, or Firm*—Bill C. Panagos

(57) ABSTRACT

An automotive sun visor is provided. The sun visor includes features such as a vanity mirror and an extender blade or slide-out sun shade. The sun visor is constructed from an cover assembly that is folded over itself and encloses a mounting frame therein. The mounting frame is secured to a vanity mirror assembly and thereby secures the cover assembly therebetween. The mounting frame also includes an articulated track for sliding reception of an extender blade. The sun visor also includes a extender blade bezel disposed with the cover assembly and including a slot formed therein. The slot is adapted for reception of said extender blade.

10 Claims, 3 Drawing Sheets

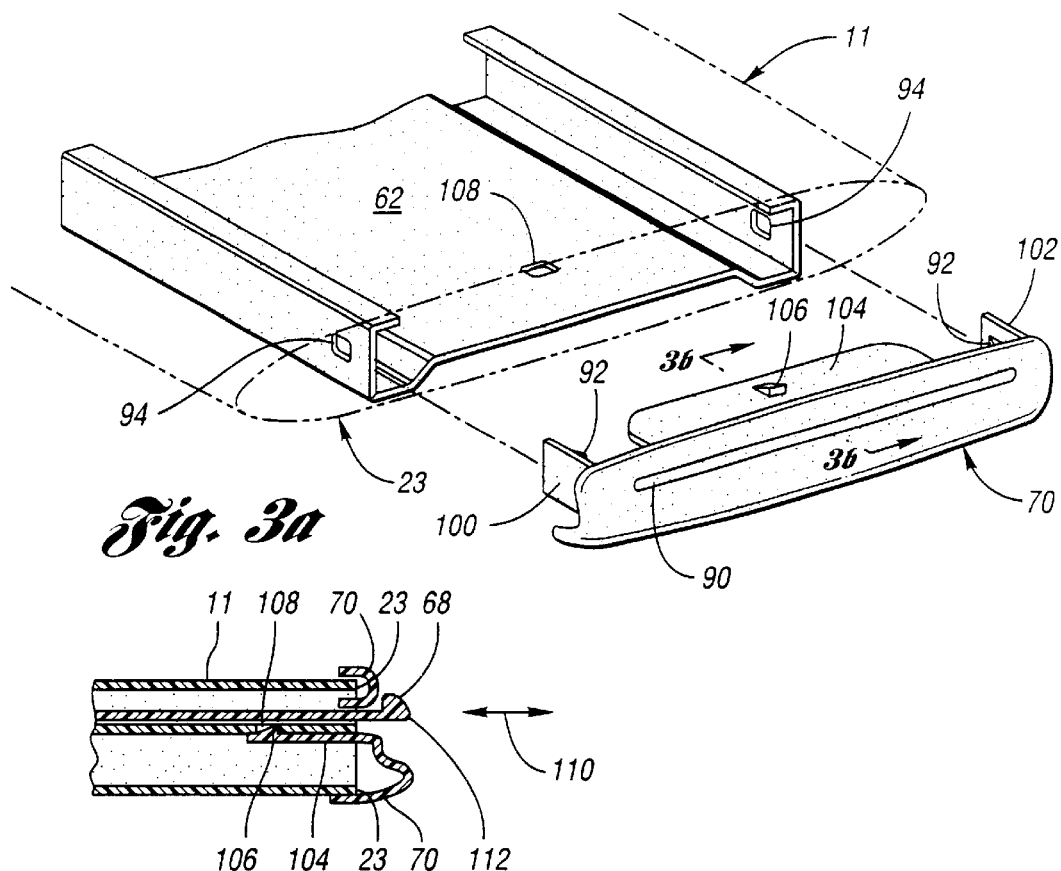
*Fig. 3a*
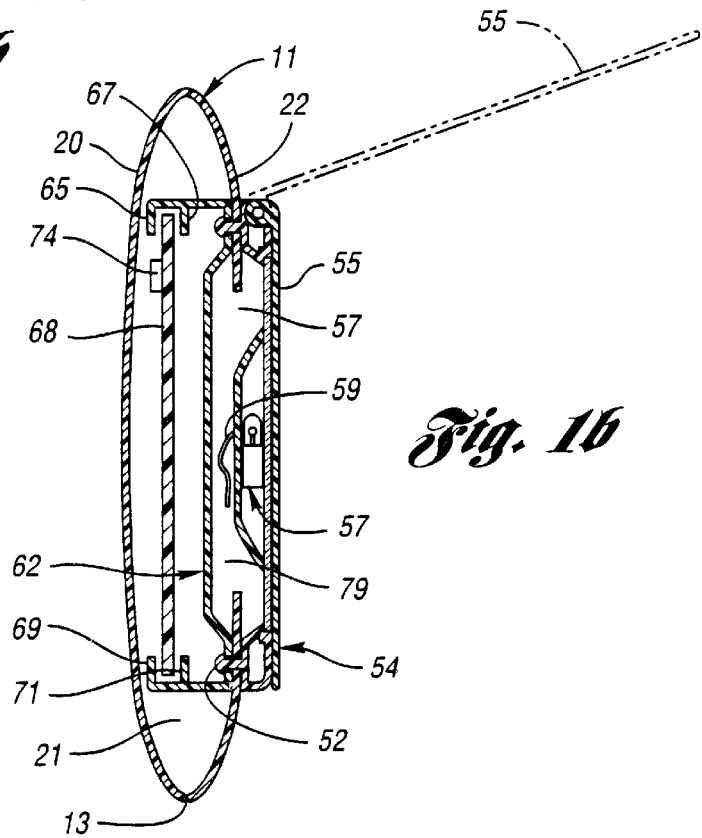
*Fig. 3b*
*Fig. 1b*

EXTENDER BLADE MOUNTING FRAME FOR A SUN VISOR

BACKGROUND OF THE INVENTION

1. Technical Field

The present invention relates generally to automotive sun visors. More specifically, but without restriction to the particular embodiment and/or use which is shown and described for purposes of illustration, the present invention relates to an automotive sun visor having an extender blade and associated mounting frame.

2. Discussion

Sun visors for automobiles have optional features for customer convenience. These features include vanity compartments and extender blades. There is constant competitive pressure to provide increased passenger convenience with such features, while at the same time, reducing cost and complexity of the visor and its assembly. The present invention, therefore, provides a cost effective visor configuration and a simplified assembly without limiting the ability to provide features, such as vanity compartments and extender blades.

The present invention provides a truly unique and versatile visor configuration and assembly, especially when compared with prior designs, which include the designs disclosed in U.S. Pat. Nos. 5,964,494; 6,254,168; 4,858,983; and 5,580,118 that are incorporated herein by reference.

SUMMARY OF THE INVENTION

It is one aspect of the present invention to provide a cost and weight effective configuration for an automotive sun visor.

It is another aspect of the present invention to provide an automotive sun visor that includes a plurality of customer features while offering a simplified assembly process.

It is a further aspect of the present invention to provide an automotive sun visor having an extender blade and lighted mirror assembly with limited internal components and assembly steps.

It is yet another aspect of the present invention to provide an aesthetic and functional extender blade bezel without unnecessary complication to the sun visor assembly, while at the same time allowing for easy adaptation and construction of visors that do not include extender blades.

In one form, the present invention concerns an automotive sun visor. The sun visor includes a lighted vanity mirror assembly and an extender blade. The visor is constructed of an outer cover assembly having a shell with symmetric first and second halves that are folded over upon each other and define an inner space therebetween. At least one half has a plurality of holes or openings.

A mounting frame is provided between the first and second halves and substantially within the inner space. The vanity mirror assembly is secured to the mounting frame. The vanity mirror assembly includes a plurality of stakes that extend through the holes formed in the outer covering and into holes or recesses formed in the mounting frame. The stakes are heat treated so that they form a bond with the mounting frame, which also secures the cover assembly therewith. The mounting frame is formed to include a main portion and depending upper and lower track portions. Each track portion is hinged to the main portion for pivotable articulation with respect to the main portion such that the track portions are disposed in an opposed manner. Each track portion includes an attachment element that corresponds with a mating attachment element formed with the main portion to maintain the track portions in the referenced opposed manner. The mounting frame also includes an elevated portion to allow for wiring to extend to and from the lighted mirror assembly.

An extender blade is also provided in one form of the invention. The extender blade is optionally engaged in a sliding relationship with the mounting frame. The extender blade extends from the visor through a slot formed in a bezel attached to the distal edge of the visor. The bezel is provided optionally with the extender blade and is attached to the mounting frame by use of attachment tabs that extend from the distal edge of the visor into the inner space.

Optionally, the sun visor of the present invention does not include an extender blade. In such a case, the bezel is also not provided. Instead, halves of cover assembly are bound together on the distal edge of the sun visor. Such construction produces a non-extender version of the sun visor using minimal and similar components and limiting assembly operations.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

FIG. 1b is a cross-sectional view of the assembled automotive sun visor of the present invention;

FIG. 3a is a perspective view from the distal end of the visor of the extender blade bezel prior to attachment to the mounting frame; and FIG. 3b is a cross-sectional view along the line 3b—3b of FIG. 3a.

DETAILED DESCRIPTION OF THE PREFERRED EMBODIMENT

An apparatus comprising an automotive sun visor is provided. In the following description, numerous specific details are set forth in order to provide a more comprehensive description of the present invention. It will be apparent, however, to one skilled in the art, that the present invention may be practiced without these specific details. In other instances, specific details of well known features have not been described so as not to obscure the present invention.

Figure 1A:
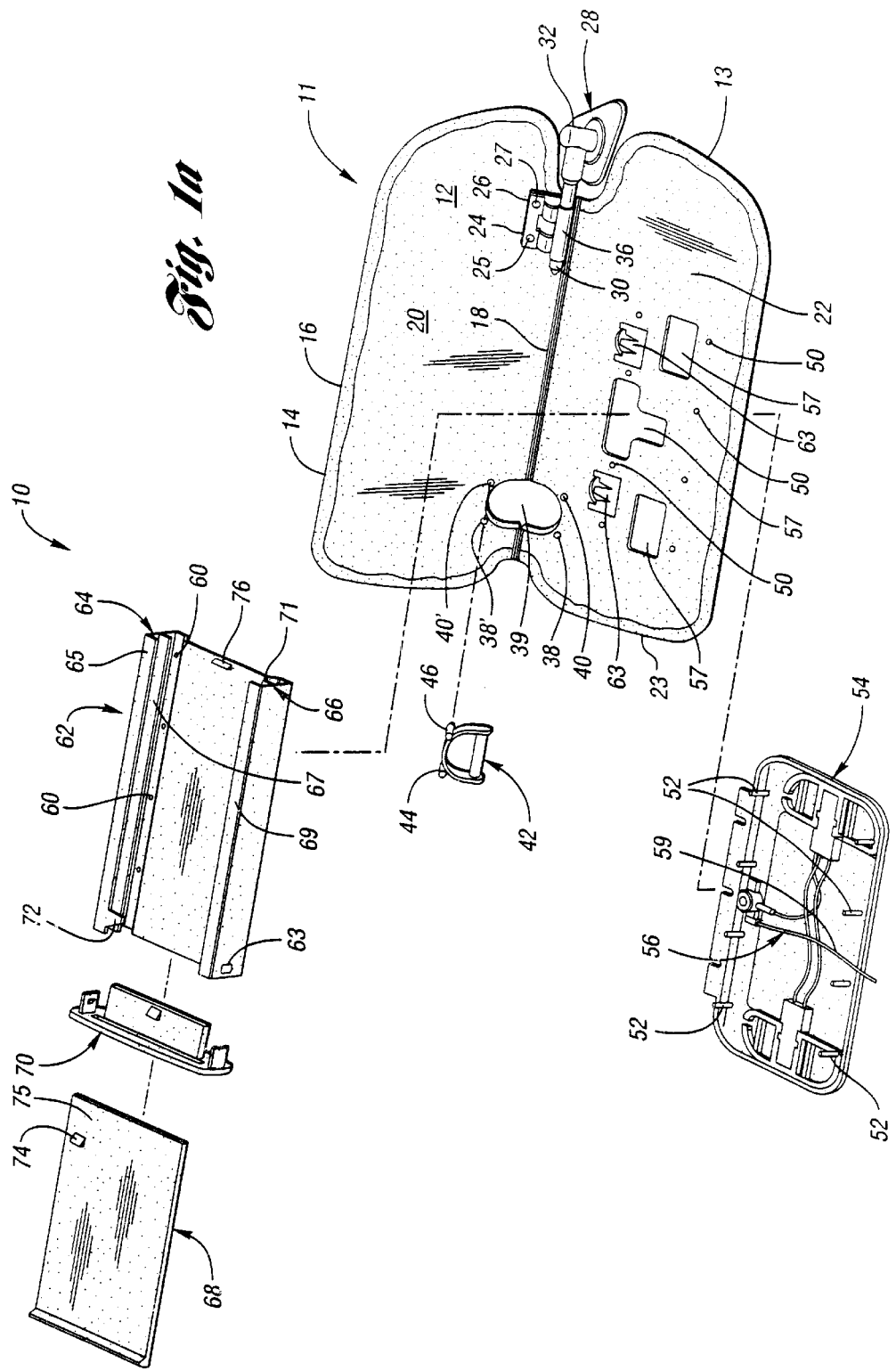
FIG. 1a is an exploded view of the automotive sun visor of the present invention.

Referring now to the drawings, FIG. 1a illustrates an exploded view of the automotive sun visor 10 of the present invention. The sun visor 10 includes a cover assembly 11 that defines the periphery 13 of the visor 10. A component of cover assembly 11 is a cardboard shell 12, which is preferably made of laminated kraft paper having the thickness between 0.02 and 0.20 inches. It should be noted that kraft paper is preferable because of its suitability and low cost, however, other materials of suitable stiffness and weight characteristics could be employed as shell 12. Shell 12 is configured to define the outer periphery 13 of the sun visor 10 when shell is folded and assembled as shown in FIG. 1b. For this reason, shell 12 is commonly referred to in the art as a "butterfly shell."

Score lines, or creases, 18 are formed in shell 12 so that the shell 12 can be folded about the axis defined by the score lines 18 in an easy and controlled manner during assembly. Score lines 18 divide shell into two substantially symmetric shell halves 20 and 22, as is well known in the art. When the shell halves 20, 22 are folded upon each other an inner pocket or space 21 is created. The inner space is best illustrated in FIG. 1b. This inner space 21 is substantially surrounded by the cover assembly 11.

Shell 12 is covered by an upholstered material 14 to provide a pleasing aesthetic surface to the cover assembly 11 and ultimately the sun visor 10. Upholstered material 14 is typically formed from a decorative vinyl or cloth outer covering bonded to a foam backing (not shown), as is known in the art. Upholstered material 14 includes an excess edge 16 which folds around the periphery 13 of the shell 12 and is adhesively or otherwise bonded thereto, as is known in the art. During visor assembly, a second adhesive, or other joining means such as stitching, is employed near the periphery 13 of shell 12 as halves 20 and 22 are folded about score lines 18 and bonded together. Bonding the "butterfly shell" 12 together in this fashion creates to aforementioned inner space 21.

In one form, stitching or adhesive is not employed on the distal edge 23 of the cover assembly 11. This allows for the addition of an extender blade feature. Optionally, if the extender blade feature is not desired, adhesive or stitching secures halves 20 and 22 together at the distal edge 23 thereof as well.

Shell 12 of cover assembly 11 includes a plurality of mounting holes used to attach various components thereto. Mounting holes 24 and 26 are utilized to secure the visor support rod assembly 28 to shell 12. The visor support rod assembly 28 includes a pin section 30 and a mounting section 32. A mounting section 32 attaches directly to the vehicle interior in a manner well known in the art (not shown). The pin section 30 extends from the mounting section 32 and is attached to a detent clip 36. The detent clip 36 surrounds pin section 30 and is attached to the shell 12 by the use of rivets or pegs 25 and 27 that correspond to holes 24 and 26, respectively.

Cover assembly 11 also includes an aperture 39 formed therein for reception of a D-ring 42. D-ring 42 is adapted to attach to a clip or other attachment mechanism extending from the vehicle interior (not shown) in a manner well known in the art. D-Ring 42 is secured to the cover assembly 11 by use of pegs and mating holes. D-ring 42 includes pegs 44 and 46 that extend transversely from D-ring 42. Peg 44 is adapted for engagement into mounting holes 38 and 38' formed in shell 12. Peg 46 is adapted for engagement to mounting holes 40 and 40', also formed in shell 12. It should be appreciated that pegs 44 and 46 are placed into mounting holes 38' and 40' initially, then as shell halves 20 and 22 are folded onto each other during visor assembly, pegs 44 and 46 engage holes 38' and 40' respectively, thereby securing D-ring 42 to shell 12.

Cover 11 also includes a plurality of heat stake holes 50 disposed on half 22 thereof. It should be appreciated that heat stake holes 50 are formed though upholstered material 14 as well as shell 12. Stake holes 50 locate and receive stakes 52 projecting from the back side of the vanity mirror assembly 54. Vanity mirror assembly 54 includes a mirror (not shown), cover 55 (shown in FIG. 1b), and electrical lighting system 56.

Half 22 of cardboard shell 12 also includes at least one opening 57 to facilitate wiring the electrical lighting system 56 of the vanity mirror assembly 54. The wires 59 for the electrical lighting system 56 generally pass from the vanity mirror assembly 54, through opening 57 and into inner space 21. The wires 59 are then routed towards the pin section 30 of the visor support rod assembly. The pin section 30 is hollow to allow wires 59 to pass therethrough and connect with the electrical system of the vehicle.

Stakes 52 of the vanity mirror assembly extend through holes 50 in shell 12 and also through holes 60 or into recesses of the preferably plastic mounting frame 62 disposed substantially within the folded halves 20, 22 of the shell 12. Stakes 52 are attached to mounting frame 62 via technology known as heat staking. Using heat stake technology, stakes 52 are fused into holes 60 and secure vanity mirror assembly 54 to mounting frame 62 and affirmatively locate and attach shell 12 therebetween. While the illustrated embodiments disclose the stakes being formed on the back of the vanity mirror and the holes being formed on the frame member, it is envisioned that the converse of the arrangement would also work satisfactorily. That is, the stakes could be formed in the mounting frame and the holes formed in the back of the vanity mirror assembly. Optionally, clips 63 can be utilized to further secure the vanity mirror assembly 54 to the cover assembly 11.

Mounting frame 62 includes two tracks, upper track 64 and lower track 66 that are disposed in an opposed relationship to allow extender blade 68 to slide therein. Track 64 is disposed on the top of mounting frame 62 and is formed by a top ski 65 and bottom ski 67 disposed vertically apart. Conversely, track 66 is disposed on the bottom of mounting frame 62 and is formed by a top ski 69 and a bottom ski 71 disposed vertically apart. Mounting frame 62 also includes attachment structures 63 to secure the extender blade bezel 70 thereto. Additionally, mounting frame includes a stop 72 to cooperate with the vertical end of an inclined peg 74 to limit travel of the extender blade 68 in the transverse direction and to help prevent the extender blade from sliding out of the visor 10. Stop 72 projects from top ski 65 of track 64 toward track 66 to align itself with peg 74 that protrudes upward from the front face 75 of the extender blade 68. Additionally, mounting frame 62 includes a rearward stop 76 to limit inward movement of the extender blade 68. Rearward stop 76 projects upward from mounting frame 62 to a height at least higher than bottom skis 67, 71, and preferably, a height between bottom skis 67, 71 and top skis 65, 69.

Turning specifically to FIG. 1b, mounting frame 62 is disposed substantially within outer covering 11 of the sun visor 10 and in space 21. Heat stakes 52 connect the vanity mirror assembly 54 to the mounting frame 62. It should be appreciated that this attachment locks the vanity mirror assembly 54, the mounting frame 62, and the cover assembly 11 together. It should also be appreciated that the heat stakes 52 are the only structural components that extends from outside the cover assembly 11 into the inner pocket or space 21.

Figure 2:
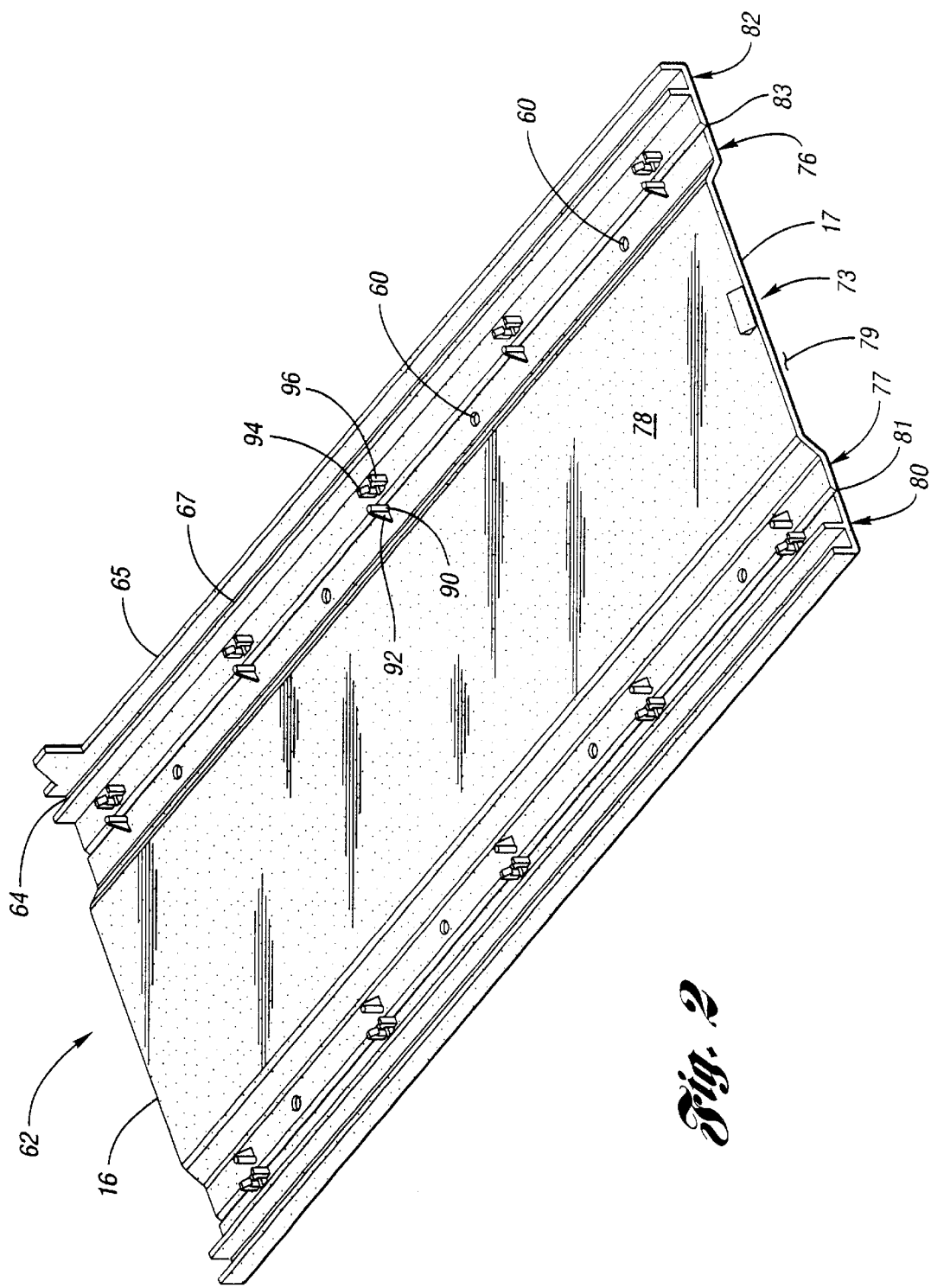
FIG. 2 is a perspective view of the mounting frame of the present invention.

Turning to FIG. 2, a non-assembled mounting frame 62 is illustrated. Mounting frame 62 includes an elevated portion 78 that forms the main body portion 73 of the mounting frame. Elevated portion 78 is disposed in a position removed from half 20 of shell 12 and from the vanity mirror assembly 54. Elevated portion 78 extends longitudinally along the complete length of mounting frame 62 such that each end 16, 17 forms a hat section. Elevated portion 78 steps down on either side to create a base portion 77, 76 on opposite sides thereof, that also extend the longitudinal length of frame 67. Elevated portion 78 acts to provide an area 79 in which wires 59 of the electrical lighting system 56 can generally pass between the vanity mirror assembly 54 and inner space 21 by cooperating with opening 57. Wires 59 extend in a longitudinal direction to exit from the area 79 created by elevated portion 79 at either end 16 or 17 of mounting frame 62. Base portion 77 is connected to lower track portion 80 via a living hinge 81. Likewise, base portion 76 is connected to upper track portion 82 via living hinge 83. It should be appreciated that upper track portion 82 is substantially identical to lower track portion 80, therefore, for ease of illustration, only upper track portion 82 will be described in detail. Providing articulating track portions 80 and 82 provide many benefits including access to heat stake holes 60 during assembly. Having track portions in their opposed positions would burden the heat stake operation because skis 65, 67, 69 and 71 are disposed directly above the heat stake holes 60. Additionally, having a relatively flat mounting frame 62 before assembly simplifies the mold needed to make frame 62.

Upper track portion 82 includes track 64 that is formed by top ski 65 and bottom ski 67. Skis 65 and 67 extend longitudinally along the mounting frame to define a passageway or track 64. Living hinge 81 between the base portion 76 and the track portion 82 allows for controlled articulation of the track portion 82. As track portion 82 is pivoted about living hinge 81, peg 90 having a supporting bracket 92, engages opposed clipping arms 94 and 96. Opposed clipping arms 94 and 96 include an inclined surface that contacts peg 90 and forces projecting arms 94 and 96 outward. As the inclined surfaces of pegs 94 and 96 move past peg 90 and onto supporting bracket 92, arms 94 and 96 resile and affirmatively lock the track portion 82 in a perpendicular arrangement with base portion 76. It should be appreciated that the lower track portion 80 is articulated in the same manner such that lower track 66 is disposed in an opposed relationship with upper track 64. It should further be appreciated that more than one of the above-described attaching elements can be employed for use with the present invention. The number of attaching elements is dependent on a number of factors such as length and weight of the skis. In the preferred embodiment, there are five attaching elements on each side but it should be appreciated that any such number or any other means to secure track portion 80 in its upright position can be utilized in the present invention. Accordingly, it is well within the scope of the present invention to utilize any number of attaching elements whether they be of the type described or of a type generally used to attach two components in a secure fashion.

Turning to FIGS. 3a and 3b, attachment of the extender blade bezel 70 to mounting frame 62 is shown. As can be appreciated from the cross-sectional view of FIG. 3b, extender blade bezel 70 covers the distal edge 23 of the cover assembly. Extender blade bezel 70 includes a slot 90 to facilitate movement of the extender blade 68 outside of the cover assembly 11. Bezel 70 also includes opposed tabs 100 and 102 that extend toward mounting frame 62 for attachment thereto. Tabs 100 and 102 both include an inclined peg structure 92 that locks into an associated hole structure 94 that acts as an attaching element. Bezel 70 also includes a main body tab 104 that extends therefrom just below slot 90. Main body tab 104 also includes an inclined peg structure 106 for attachment to an associated mounting structure 108 formed in elevated portion 78 of mounting frame 62. FIG. 3b is a cross-sectional view that illustrates the extender blade 68 disposed in its appropriate position within receiving slot 90. As should be appreciated, bezel 70 and skis 65, 67, 69, 71 as well as other components of the sun visor 10 limit movement of extender blade 68 except in the longitudinal direction as shown by arrow 110 in FIG. 3b. As discussed in detail below, other features are incorporated into the sun visor of the present invention to control the maximum longitudinal movement of the extender blade.

With reference to FIGS. 3b and 1a, installation of extender blade 68 will now be described in detail. Once bezel 70 is attached to mounting frame 62, extender blade 68 is inserted through slot 90. As inclined peg 74 reaches slot 90, its inclined surface forces slot 90 slightly larger in a controlled fashion. As the inclined surface passes slot 90, slot 90 resiles to its original shape and locks extender blade 68 therein. It should be noted that such action in the opposite direction is not aided by an inclined surface, effectively prohibiting blade 68 from disengaging from slot 90. In a similar manner, inclined peg 74 passes by stop 72 by use of its included surface. Once peg 74 passes stop 72 the outward-most position of the extender blade 68 is defined. Extender blade 68 can be inserted further into cover assembly 11 until its back end 112 reaches rearward stop 76. It should be appreciated that the distance between stop 76 and the outer portions of the bezel 70 are slightly smaller than the length of the extender blade 68.

Optionally, the visor 10 of the present invention can be configured without the extender blade feature with minimal assembly changes. In such a configuration, extender blade 68 and bezel 70 are not utilized. Instead, the distal edge 23 of half 22 is adhered, stitched, or otherwise attached to half 20 defining periphery 13 of the visor 10.

The foregoing description constitutes the preferred embodiments devised by the inventors for practicing the invention. It is apparent, however, that the invention is susceptible to modification, variation and change that will be obvious to those skilled in the art. In as much as the foregoing description is intended to enable one skilled in the pertinent art to practice the invention, it should not be construed to be limited thereby but should be construed to include such aforementioned obvious variations and be limited only by the proper scope and fair meaning of the accompanying claims.

What is claimed is:

1. An automotive sun visor comprising:
   a cover assembly having a first half and a second half enclosing a space therebetween;
   a mounting frame disposed substantially within said space, said mounting frame including a base portion and two opposed side portions, each said side portion connected to said base portion via a living hinge to allow articulation therewith during assembly, wherein one of said side portions includes a clip having resilient arms, said resilient arms adapted for attachment to a peg projecting from said base portion, said resilient arms and said pegs maintain said side portion in a substantial perpendicular relationship with said base portion;
   an extender blade received by said mounting frame and adapted to slide thereon; and
   a structure disposed substantially outside of said space, said structure attached to said mounting frame such that said cover assembly is secured thereby.

2. The invention as set forth in claim 1, wherein said structure is attached to said mounting frame at two points which are separated by an elevated portion formed in said mounting frame, at least one of said two points disposed below one of said side portions when articulated.

3. The invention as set forth in claim 2, wherein said mounting frame includes a track disposed on one of said side portions upon which said extender blade is received, said track comprising an upper ski and a lower ski, said extender blade adapted to slide therebetween.

4. The invention as set forth in claim 1, wherein said structure includes a plurality of stakes extending therefrom, said cover assembly including a plurality of holes for reception of said stakes, said mounting frame also including a plurality of holes for reception of said stakes, said stakes being treated by heat to produce a bond between said stakes and said mounting frame while securing said cover assembly between said structure and said mounting frame.

5. The invention as set forth in claim 1, further comprising a extender blade bezel disposed substantially outside said space, said bezel including a plurality of attachment tabs for securing said bezel to said mounting frame, said bezel also including a slot for reception of said extender blade.

6. The invention as set forth in claim 2, wherein said structure is a vanity mirror assembly and includes a wire extending therefrom, said elevated portion of said mounting frame being adapted for reception of said wire, said wire extends from said vanity mirror assembly, though an opening formed in said cover assembly to said elevated portion of said mounting frame.

7. An automotive sun visor comprising:

a cover assembly having a first half and a second half enclosing a space therebetween;

a mounting frame disposed substantially within said space;

an extender blade received by said mounting frame and adapted to slide thereon;

a bezel selectively secured to said mounting frame and having a slot formed therein for reception of said extender blade, said bezel disposed substantially outside of said space, said bezel disposed to cover an edge of said cover assembly formed by said first half and said second half, said bezel includes a plurality of tabs that extend therefrom for selectively securing said bezel to said mounting frame, said tabs mate with attachment elements formed on said mounting frame to secure said bezel to said mounting frame;

said first half and said second half are capable of being secured together at a periphery;

said extender blade is inserted through said slot during assembly, said extender blade includes an inclined peg protruding from at least one face thereof, said inclined peg acts on said bezel forcing said slot to expand, said inclined peg also prevents said extender blade from exiting said slot after assembly;

a vanity mirror assembly disposed substantially outside of said space, said vanity mirror assembly attached to said mounting frame while said cover assembly is maintained in a fixed relationship;

said mounting frame includes a main portion and two opposed side portions, each said side portion connected to said base portion via a living hinge to allow articulation therebetween during assembly;

said mounting frame includes a track disposed on one of said side portions upon which said extender blade is received, said track comprising an upper ski and a lower ski, said extender blade adapted to slide therebetween; and wherein at least one of said side portions includes a clip having resilient arms, said resilient arms adapted for attachment to a peg projecting from said main portion, said resilient arms and said pegs maintain said side portion in a substantial perpendicular relationship with said main portion.

8. The invention as set forth in claim 7, wherein said vanity mirror assembly includes a wire extending therefrom, said mounting frame including an elevated portion for reception of said wire, said wire extends from said vanity mirror assembly through an opening formed in said cover assembly, to said elevated portion of said mounting frame.

9. The invention as set forth in claim 8, wherein said mounting frame and said vanity mirror assembly are attached at two points, said two points separated by said elevated portion of said mounting frame.

10. An automotive sun visor comprising:

a vanity mirror assembly having at least one wire extending therefrom;

a cover assembly comprising a shell having first and second halves folded together defining a space therebetween, a plurality of holes formed in said shell, and an upholstery material attached to said shell;

a mounting frame disposed between said first and second halves and secured to said vanity mirror assembly by at least two heat stakes, each of said heat stakes extending through one of said plurality of holes and are fused to said mounting frame such that said mounting frame and said vanity mirror assembly enclose said cover assembly therebetween creating a fixed relationship between said vanity mirror assembly, said mounting frame, and said cover assembly; said mounting frame includes a main portion and depending upper and lower side portions, each side portion hinged to said main portion for articulation of said side portions relative to said main portion prior to assembly of said sun visor, each said side portion including an attachment element adapted to secure to a mating attachment element on said main portion to maintain said side portion in an articulated position such that said side portions are disposed in an opposed manner, each said side portion comprising a track having a set of opposed skis to define a passageway, said main portion of said mounting frame including an elevated portion disposed between said at least two heat stakes and adapted to allow said at least one wire to extend from said vanity mirror assembly and into said space;

an extender blade mounted in at least one passageway for sliding movement from a retracted position substantially within said space to an extended position wherein said extender blade at least partially extends from said space; and a bezel having a slot formed therein for reception of said extender blade, said bezel disposed substantially outside of said space and including attachment tabs to selectively secure said bezel to said mounting frame.

* * * * *